United States Patent
Wachob et al.

(10) Patent No.: US 10,616,661 B2
(45) Date of Patent: *Apr. 7, 2020

(54) INTEGRATED COAX/ETHERNET DISTRIBUTION SYSTEM

(71) Applicant: ANTRONIX INC., Cranbury, NJ (US)

(72) Inventors: David Earl Wachob, New Hope, PA (US); Neil Tang, Marlboro, NJ (US); Juan Rafael Bravo, New Hope, PA (US)

(73) Assignee: ANTRONIX INC., Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/270,852

(22) Filed: Feb. 8, 2019

(65) Prior Publication Data

US 2019/0174201 A1   Jun. 6, 2019

Related U.S. Application Data

(63) Continuation of application No. 15/383,781, filed on Dec. 19, 2016, now Pat. No. 10,237,626, which is a continuation of application No. 14/120,971, filed on Jul. 17, 2014, now Pat. No. 9,635,324.

(60) Provisional application No. 61/958,066, filed on Jul. 19, 2013.

(51) Int. Cl.
*H04N 21/647* (2011.01)
*H04N 21/61* (2011.01)
*H04N 7/22* (2006.01)
*H04B 10/2575* (2013.01)
*H04N 21/436* (2011.01)

(52) U.S. Cl.
CPC .. *H04N 21/64707* (2013.01); *H04B 10/25751* (2013.01); *H04N 7/22* (2013.01); *H04N 21/43615* (2013.01); *H04N 21/61* (2013.01); *H04N 21/6118* (2013.01); *H04N 21/6125* (2013.01); *H04N 21/647* (2013.01)

(58) Field of Classification Search
CPC ....... H04N 21/64707; H04N 21/43615; H04N 21/6118; H04N 7/22; H04B 10/25751
See application file for complete search history.

(56) References Cited

U.S. PATENT DOCUMENTS

| | | | |
|---|---|---|---|
| 7,778,546 B2 | 8/2010 | Sucharczuk et al. | |
| 8,180,222 B2 | 5/2012 | Sucharczuk et al. | |
| 8,325,759 B2 | 12/2012 | Hazani et al. | |
| 2003/0046706 A1* | 3/2003 | Rakib | H04L 45/10 725/111 |
| 2005/0034159 A1* | 2/2005 | Ophir | H04L 12/2801 725/78 |
| 2007/0019959 A1* | 1/2007 | Retnasothie | H04B 10/25752 398/115 |
| 2012/0066724 A1 | 3/2012 | Zussman | |

* cited by examiner

*Primary Examiner* — Chenea Davis
(74) *Attorney, Agent, or Firm* — Volpe and Koenig, P.C.

(57) ABSTRACT

The present invention provides for eliminating the requirement for cable modems and routers to be installed in subscribers homes, and/or establishments, by instead including the cable modems and routers in a CATV provider's main distribution line, for sharing amongst a plurality of subscriber homes and/or establishments.

21 Claims, 12 Drawing Sheets

INTEGRATED COAX/ETHERNET DISTRIBUTION SYSTEM

RELATED APPLICATION

This application is related to and is a continuation of U.S. patent application Ser. No. 15/383,781 filed on Dec. 19, 2016 which is a continuation of U.S. patent application Ser. No. 14/120,971, filed Jul. 17, 2014 now U.S. Pat. No. 9,635,324 issued on Apr. 25, 2017, which claims priority from Provisional Application No. 61/958,066, filed on Jul. 19, 2013, and both titled "Integrated Coax/Ethernet Distribution System." Also, this present application incorporates by reference, to the extent that there is not a conflict therebetween, the provisions of the aforesaid Parent applications.

FIELD OF THE INVENTION

The field of the invention is broadly related to CATV Distribution Systems, and more narrowly to such systems that reduce the cost of devices required in the home or facility of a subscriber to the system.

BACKGROUND OF THE INVENTION

The proposed system allows for the delivery of Internet data via CATV's "broadband coax infrastructure", in a more cost effective deployment than today's "conventional" broadband infrastructure implementation. To highlight the differences, let's first begin by reviewing the current broadband infrastructure.

FIG. 1 highlights the "last mile" of a prior typical high speed broadband system implementation as presently used. As shown, the portion of the system included in the CATV providers main distribution line, includes a fiber node 2 for receiving from a fiber optic cable 1 light modulated signals from the headend of the provider, and converting the light signals to RF output signals connected to the input of a line extender 4. A coaxial cable 5 feeds the output of the line extender to the input of a CATV tap 6. The CATV tap 6 typically includes a plurality of splitters (not shown) for splitting off a plurality of portions of the CATV signal, the portions being provided at Terminals for connection via coaxial cables to a plurality of houses or facilities, respectively, subscribing to the associated CATV service. As shown in FIG. 1, for purposes of simplified illustration, a first coaxial cable 10 is connected between the CATV tap 6 and a subscriber's house 32, a second coaxial cable 9 also being connected there between. Also, in an nth coaxial cable illustrated as 14, is connected from the CATV tap 6 to an nth subscriber's house, but for practical purposes it should be understood that the number of tap offs provided by CATV tap 6 is limited to the present state-of-the-art. All of the connections between the CATV tap 6 and various homes and/or business establishments of subscribers provides for bidirectional signal transfer there between. Within the subscriber's home 34, the splitter 22 splits off a portion of the CATV signal onto a coaxial cable 24 connection to various TV sets, set-tops, and so forth. Splitter 22 also splits off via coaxial cable 23 CATV signals that are connected to a cable modem 24. In this example, the cable modem 24 converts the CATV RF signals to Ethernet or USB signals which are connected to a Wi-Fi node 26. Also shown within the home 34 is a personal computer (PC 30) that is connected to a Wi-Fi/RF transceiver 28.

With further reference to FIG. 1, it illustrates a CATV tap 6, as well as the subsequent or additional line extender(s) (such as amplifiers, not shown) and CATV system tap(s) (not shown), that would typically be present within the last mile of a CATV network. The specific number of line extenders and taps present in the CATV network is dependent on the distance from the CATV tap 6 to the subscriber homes and/or business establishments, the density of those homes (i.e., homes and/or establishments per given geographic area), and the subscription rate (i.e., number of paying customers) within the geographic area.

Communications signals, i.e., video/audio, high speed data, and control information, are transmitted (and potentially also returned) on the CATV system at prescribed frequencies/wavelengths, as determined by the CATV operator. The exact frequencies and wavelengths of those signals are determined by both industry agreed upon conventions, and the specific bandwidth requirements of each CATV operator. These communication signals on the "right" side of the fiber node 2 (i.e., to/from the "last mile"), are typically transported as RF signal on a coaxial cable, at frequencies consistent with the above, and generally up to 1.2 GHz.

On the left side of the fiber node 2 (i.e., to and from the headend), the signals are generally transported on fiber optic cables 1, using specific industry standard laser wavelengths and modulation, also consistent with the above. These signals may also be transported to/from the headend as RF signals on coaxial cables (at similar or different frequencies than the last mile), or some combination of fiber optic and coaxial cables. Within the fiber node 2 itself, the signals are converted to the "last mile" RF frequencies (regardless of how they might have been received/sent from the CATV headend), and amplified for distribution to the last mile as indicated. Also contained within these signals are control signals to and from the headend to the home(s) which provide for authorization, configuration and control of video/audio set-tops, IP telephony hardware and cable modems, that may be present within the home(s). These signal are generated via a "system controller" present at the CATV headend (or other central location), but not illustrated.

Also shown on FIG. 1 is the typical interfacing into a typical residence via an RF splitter/tap 22, at the point of presence (entry) into the home, of the CATV network. As indicated, this process is "repeated" at other subsequent homes and/or business establishments (to the nth home, for example), from each tap that may be present on the CATV network, for each subscribed (i.e., paying) customer residence. Within each home, this RF splitter 22 "splits" the RF signal into two main functional pathways-the video/audio path via coaxial cable 20 (to the left of the splitter 22), and the high speed data path via coaxial cable 23 (to the right of the splitter 22). There could be additional subsequent (or combination) splits on either/both of these main video/audio and data pathways depending upon the layout of the house and the number of required video/audio and/or data outlets, but this will serve to detail the basic implementation.

The functional pathways can be described simply as those signals delivered in support of video/audio services, such as broadcast/premium channels, or Pay per View/On-Demand channels which are delivered within the video/audio (RF) spectrum on the coax cable 20, and those signals in support of data services, such as high speed data or VoIP telephony, which are delivered within the high speed data (RF) spectrum on the coax cable 23. The reality is that the actual coax cable and the combined video/audio and high speed data signals are identical in both signal pathways, only that the RF signals of each functional pathways are located at different frequencies bands on the CATV coax. Alternatively, the video/audio signals could be delivered as high speed data signals, either as independently delivered (potentially in IP video/audio format) to an IP Video/audio set-top, or as IP video/audio in the DOCSIS (Data Over Cable Service Interface Specification) format.

Inside the home (see FIG. 1), the high speed data pathway has an input to the CATV modem 24, which converts the RF signal to high speed baseband data. The output of the modem 24 then inputs the high speed data into a conventional router 26 (with optional integrated WiFi functionality, as indicated). It should be noted that this WiFi functionality may not be present at all (wherein the router 26 is "hardwired" directly to a computer via Ethernet cable), or the WiFi functionality may be a separate device hardwired to the router via an Ethernet (cable) connection. It should also be noted that the Wi-Fi node 26 could additionally include integrated VoIP functionality, interfacing directly to a telephone (not shown), or this VoIP functionality could be contained within a separate device, hardwired via Ethernet to the router. The WiFi signal is then transmitted wirelessly within the home (primarily), to other WiFi enabled devices in the home, such as computers (desk-tops and/or laptops, such as PC 30 connected to a Wi-Fi/RF transceiver or router 28), video/audio game consoles, smart-phones, tablets, PDA, WiFi enabled TVs and DVD players, etc), via the "IEEE 802.11x" (Institute of Electrical and Electronic Engineers) frequency bands (5.0 and/or 2.4 GHz).

SUMMARY OF THE INVENTION

In one embodiment of the invention the cable modem typically installed inside a subscriber's home, for example, is moved from the home into a CATV node of the CATV network. Also included in the node is a fiber node for converting optical signals from a CATV head end into RF signals for inputting to the cable modem. Further included in the node is an Ethernet to RF converter for converting the Ethernet output signals from the modem into RF signals fed into a tap, or a line extender and then a tap, for connection via various output taps of the splitter to a plurality of homes and/or business establishments. As indicated, for each of the homes and/or business establishments so connected, a cable modem will not be required within the home.

In another embodiment of the invention, both the cable modem and a Wi-Fi/RF node are moved from within the individual homes and/or business establishments of subscribers into a CATV node of the CATV network, whereby the modem and Wi-Fi/RF node functions are provided directly from the CATV node for use by a plurality of subscriber homes and/or business establishments individually connected to the CATV node. In other images, a single CATV modem, and a single Wi-Fi/RF node, within the CATV node will act to provide data services to a plurality of homes and/or business users, whereby the use of a modem and Wi-Fi/RF node in each home has been eliminated. It should be noted that in each of these homes a Wi-Fi/RF transmission device with a bandpass filter will be required, for example, should the subscriber wish to receive Wi-Fi/RF transmission within their home or business establishment. Also, a subscriber can use hardwired connections from a splitter receiving a CATV signals to individual devices receptive of the CATV signals.

In yet another embodiment of the invention, a conventional MoCA configured system is modified to include within the CATV system providers CATV node, a CATV modem, and an Ethernet-to-RF converter. As with the first embodiment of the invention mentioned above, the CATV node may also include a fiber node, a line extender, and tap(s). Note that MoCA is an acronym meaning Multimedia Over Coaxial Alliance, which is an industry standard alliance relating to coaxial cabling for enabling whole home distribution of high definition video/audio and content. In this manner, as with the first embodiment of the invention, the requirement for having a cable modem in the homes and/or business establishments of each of the CATV subscribers is eliminated. For facilitating a home subscriber's or business establishment's use of MoCA, a novel MoCA gateway device must be included within the home, along with other devices typically included in a conventional MoCA configuration, as an alternative embodiment.

Still another embodiment, the CATV node as mentioned for the previous embodiments, can otherwise be a single line extender or tap configured for connection to a CATV cable modem, and Wi-Fi/RF node, whereby the homes or business establishments of subscribers are free of the latter two devices.

BRIEF DESCRIPTION OF THE DRAWINGS

Various embodiments of the present invention are described below with reference to the accompanying drawings, in which like components or devices are identified by the same reference numeral. However, these embodiments are not meant to be limited by what is shown in the drawings as briefly described immediately below.

DETAILED DESCRIPTION OF PREFERRED EMBODIMENTS OF THE INVENTION

Figure 1:
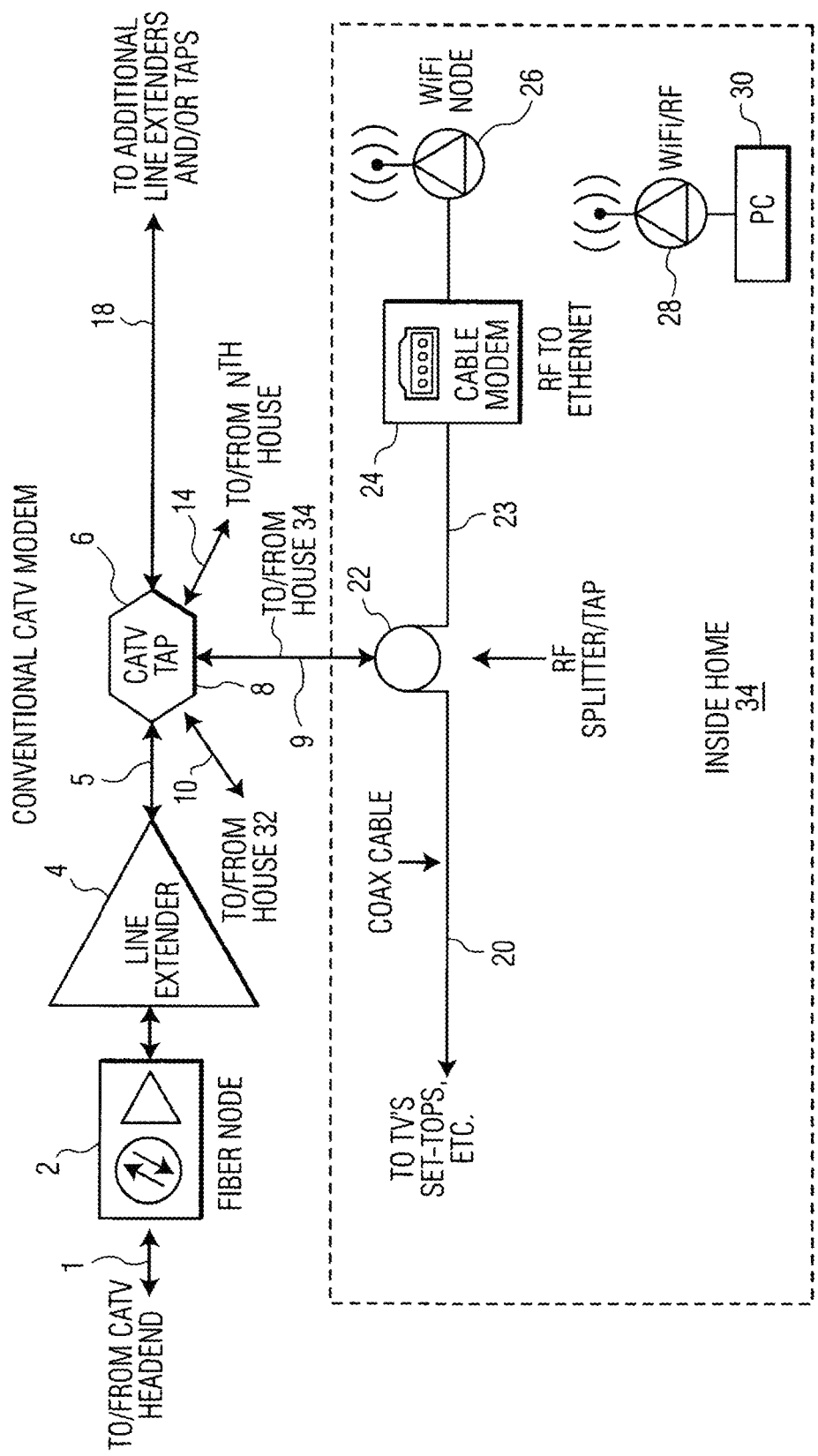
FIG. 1 is a block diagram showing a conventional or known high-speed CATV network from a CATV provider's head end to within the home of a subscriber.

In FIG. 1 a conventional or known high-speed CATV network is shown to include a fiber optic cable 1 from the headend of a CATV provider connected for bidirectional signal transfer to a fiber node 2, the latter functioning to convert the CATV optical signals into RF signals for connection to a line extender 4, whose output is connected to a CATV tap 6. Note that these connections provide for bidirectional signaling, whereby signals generated by a subscriber are passed from the CATV tap 6 to the line extender 4, and then to the fiber node 2 which converts the RF signal into an optical signal for transmission along the fiber optic cable 1 to the headend of the CATV provider. The CATV tap 6 includes a splitter or number of splitters for splitting off the CATV signal to a plurality of home subscribers via a coax cable 10 to a first subscriber's house 32, a coax cable 9 to a second subscriber's house 34, and to a practical limit an nth coax cable 14 to an nth subscriber's home and/or business establishment, each for bidirectional signaling between the homes/business establishments and the CATV tap 6. The CATV tap 6 also is connected via a main coax cable 18 to additional line extenders and/or taps (each of which are not shown) included in the main network signaling path. As further shown, within a typical one of the subscriber's homes, such as home 34, an RF splitter/tap 22 is connected via coax cable 9 to the CATV tap 6 for bidirectional signaling there between. The splitter 22 splits off one portion of the CATV signal it receives for connection via a coax cable 20 to TV's, set-tops, and other devices within home 34. The splitter 22 also splits off another portion of the CATV signal for connection via a coax cable 23 to a cable modem 24. The cable modem 24 converts the CATV RF signal it receives to an Ethernet or USB signal mode for connection to a Wi-Fi and/or router 26 for transmitting signals within the home 34, in this example. Note that a personal computer (PC) 30 is shown to be connected to a Wi-Fi/RF transceiver 28 for receiving signals from the Wi-Fi transceiver or router 26. Note that all of the aforesaid connections shown in this example provides for bidirectional signaling between devices and components shown.

Figure 2:
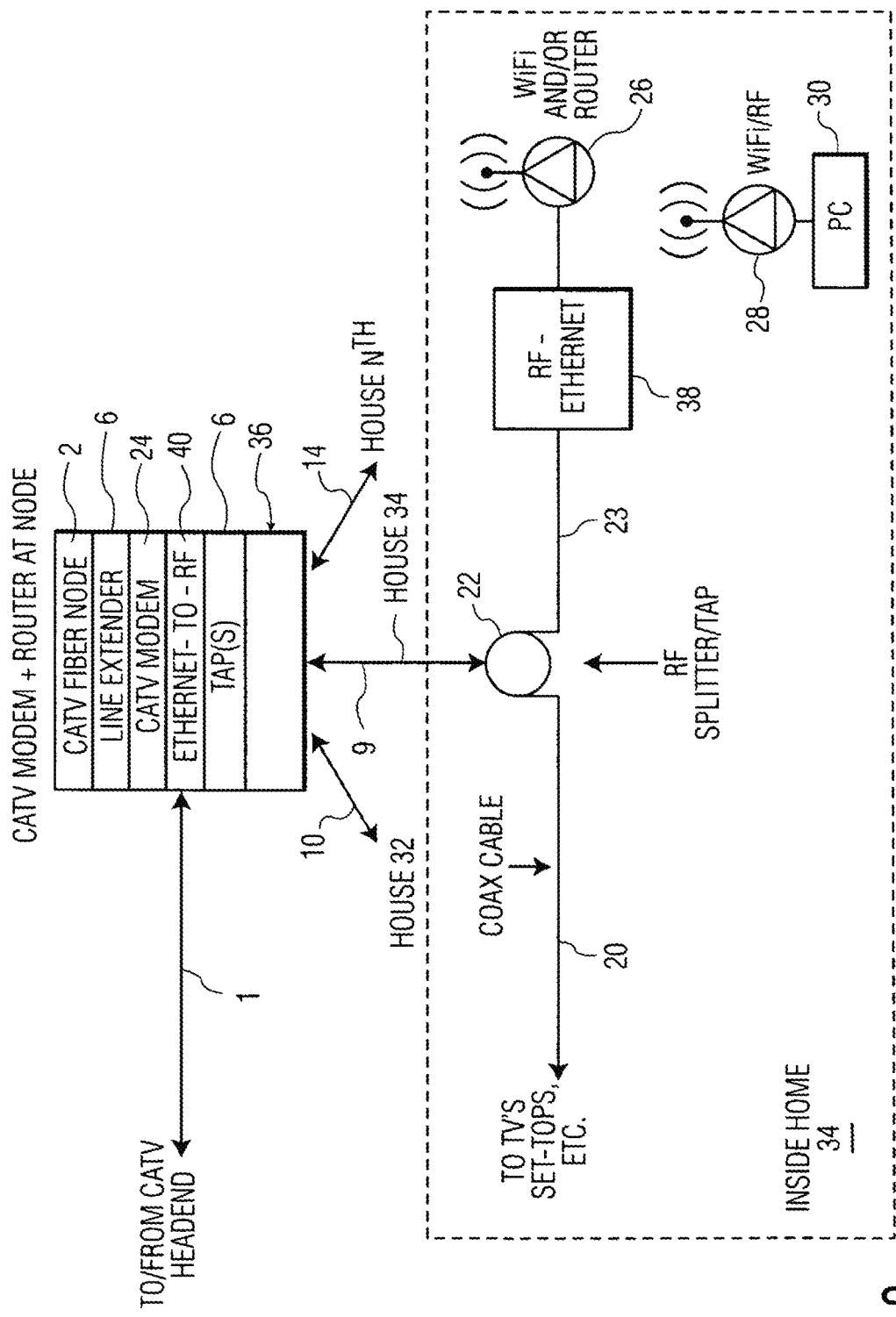
FIG. 2 is a block diagram showing a novel high-speed CATV network in which a CATV cable modem is included in a CATV node of the provider for serving a plurality of homes and/or business establishments, none of which now require a cable modem, for a first embodiment of the invention.

A first embodiment of the invention is shown in FIG. 2. In this embodiment, the cable modem 24 previously required in home 34, is now located outside the home 34 in a node 36 that includes the fiber node 2 feeding RF signals to line extender 4 (which is optional depending upon whether amplification of the RF signals is required). Also, an Ethernet-to-RF converter 40 is included in the node 36 for converting Ethernet or USB signals from modem 24 into RF signals for connection to a plurality of taps 6. The tap(s) 6 split off RF CATV signals to subscriber's homes and/or business establishments as previously described for the typical conventional CATV network of FIG. 1. Also note that the CATV modem 24 can be provided input signals from the output of the CATV fiber node 2, in absence of the line extender 4.

Figure 3:
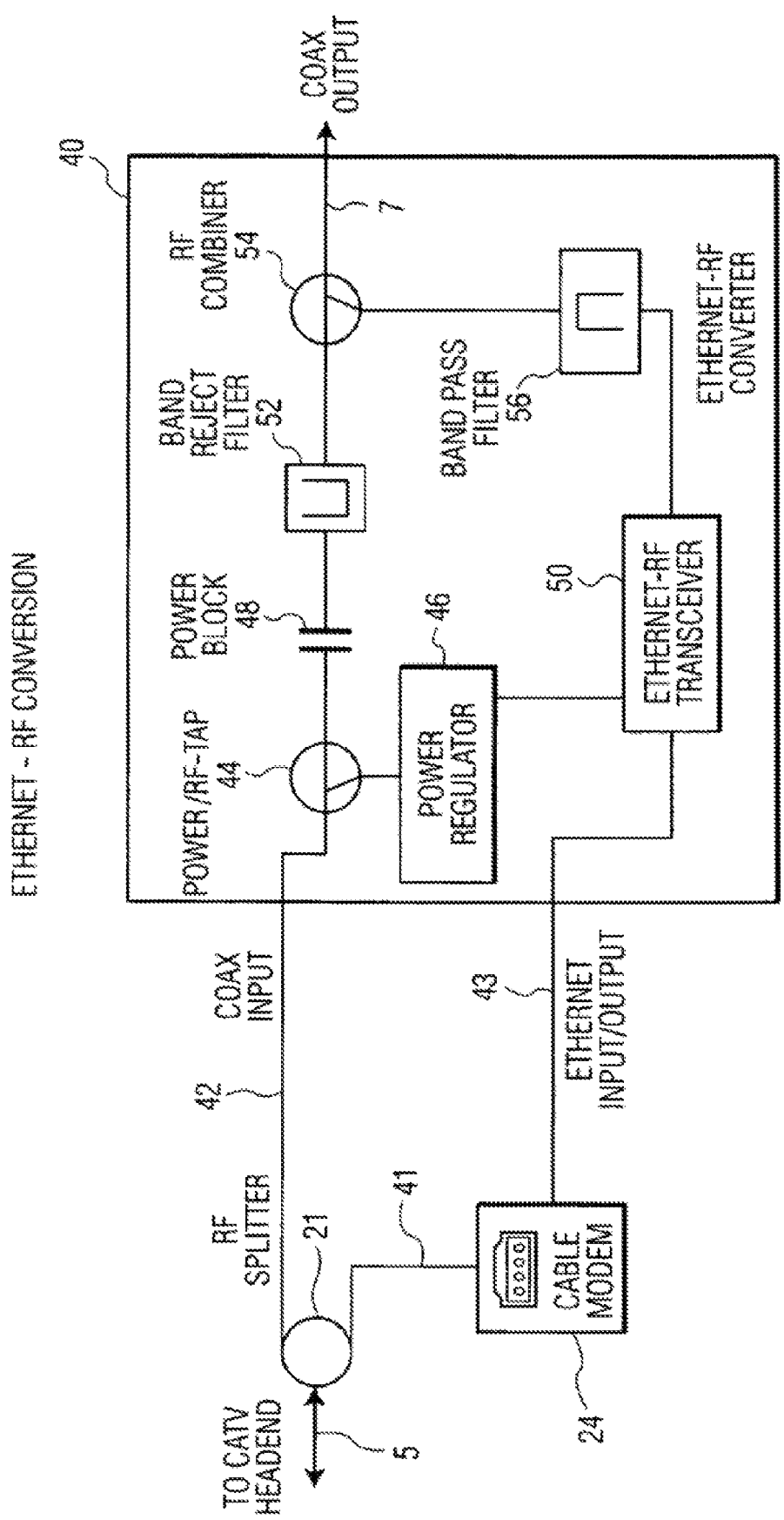
FIG. 3 is a block diagram showing a novel Ethernet-to-RF converter device for the first embodiment of the invention.

In FIG. 3, with reference to FIG. 2, the novel design of the Ethernet-to-RF converter 40 is shown, but is not meant to be limiting. The node 36 further includes an RF splitter 21 for splitting off the CATV signals received from coaxial cable 5 along a coaxial cable 42 to a DC/RF tap 44, and along another coaxial cable 41 to cable modem 24. The output from cable modem 24 is connected via Ethernet cable 43 to an Ethernet-to-RF transceiver 50, each of which devices are included within the converter 40. The DC/RF tap 44 splits off the CATV signals, for passage through a DC blocking capacitor 48, band reject filter 52, and RF combiner 54 to a coaxial output line 7, for connection to the tap(s) 6 within node 36. The DC/RF tap 44 also passes DC voltage received from the CATV headend or a distribution network power supply (not shown) to a power regulator 46 providing power to the Ethernet-RF transceiver 50. Alternatively, the power regulator 46 may otherwise be provided power. The output of the transceiver 50 is passed through a bandpass filter 56 to the RF combiner 54, for passage of CATV and data signals along a cable 7 to tap(s) in node 36, as previously described.

Figure 4:
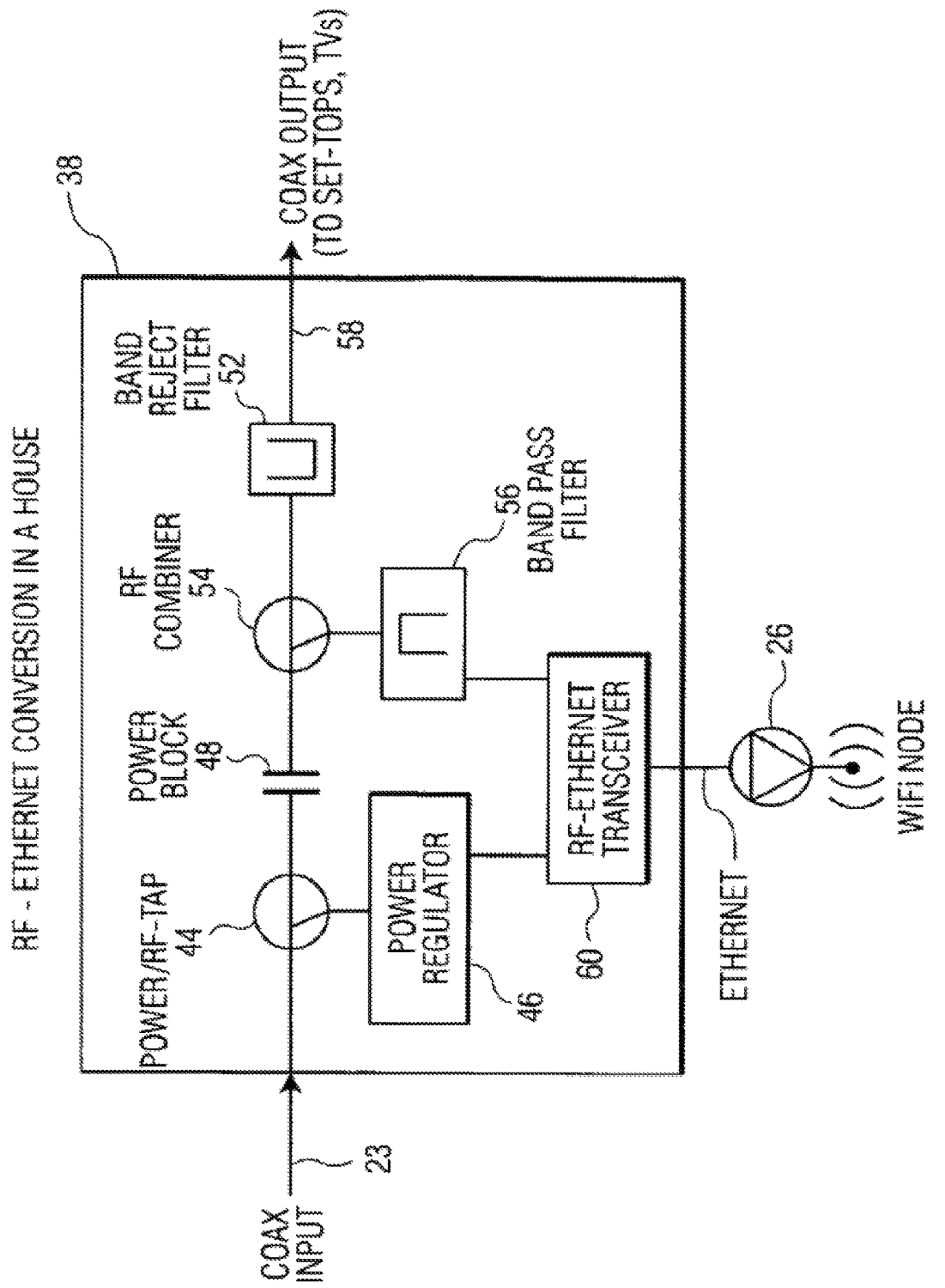
FIG. 4 is a block diagram showing a novel RF-to-Ethernet converter device for the first embodiment of the invention.

With reference to FIG. 4, and FIG. 2, the RF-to-Ethernet converter 38 within home 34 includes a DC/RF tap or splitter 44 for receiving CATV RF signals from coaxial cable 23. A power regulator 46 is provided power either via a DC voltage provided from the associated subscriber's home or business establishment. The power regulator 46 provides power to an RF-to-Ethernet transceiver 60. DC/RF splitter 44 also splits off CATV signals for passage through a DC blocking capacitor 48, RF combiner 54, and band reject filter 52, to a coaxial output 58 for connection to television sets, set-tops, and so forth within the subscriber's home or business establishment. The RF-to-Ethernet transceiver 60 sends and receives signals from RF combiner 54 via a bandpass filter 56, for converting the signals to Ethernet or USB signals, for connection to a Wi-Fi node 26, as shown in this example. Alternatively, the Ethernet signals can be directly connected by Ethernet cable to any other Ethernet device.

Figure 5:
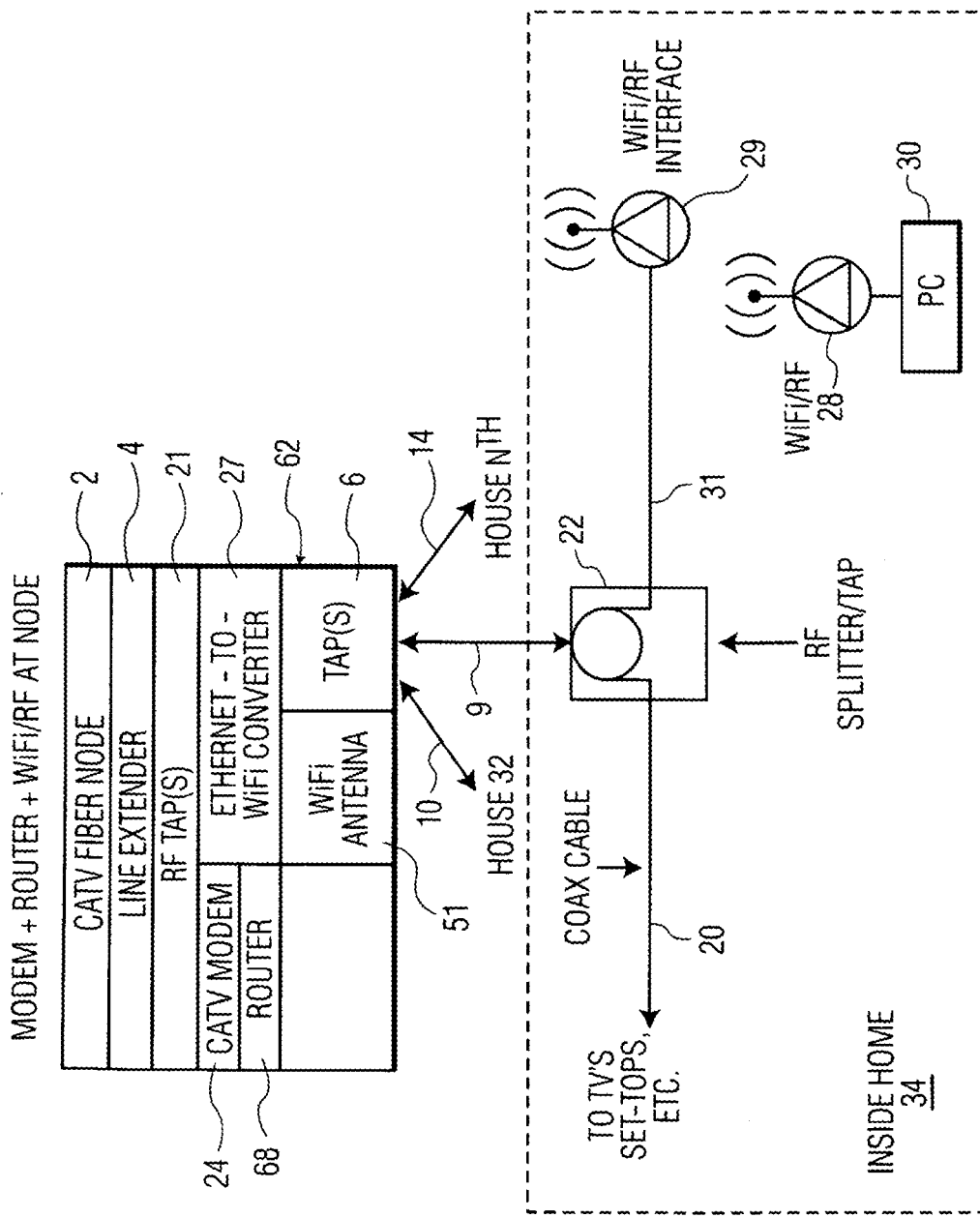
FIG. 5 is a block diagram showing a novel high-speed CATV network in which both a cable modem, and a router (Wi-Fi/RF), have each been included in a CATV node of the provider for serving a plurality of homes and/or business establishments, none of which now require the latter two devices, for a second embodiment of the invention.

A second embodiment of the invention is shown in FIG. 5, in which the Wi-Fi node 26 shown within the home or business establishment 34 in the first embodiment of the invention of FIG. 2, has been removed there from, and installed in node 62 in the CATV distribution system in association with the CATV fiber node 2, and optional line extender 4, providing RF signals to a CATV cable modem 24 and an Ethernet-Wi-Fi/RF converter 27, as shown in simplified form. An RF tap 21 receives RF signals either directly from the optional line extender 4, or from the CATV fiber node 2. The RF tap 21 splits off RF signals for connection to a CATV modem 24, and in turn, an Ethernet-to-Wi-Fi converter 27. The CATV modem 24 provides Ethernet output signals to a router 68, with the latter operating to route Ethernet signals to a plurality of houses or business establishments (not shown). The Ethernet-to-Wi-Fi converter 27 can optionally provide Wi-Fi signals to a Wi-Fi/RF antenna 51, and via tap(s) 6 a plurality of houses via coaxial cables 10, 9, and 14, for example (many more than three houses are business establishments may be involved). Note that FIG. 6, as described further below, shows greater details of this second embodiment of the invention. In this manner, a plurality of homes and/or business establishments connected to CATV node 62 will not require a cable modem 24 or router/Wi-Fi node 26. However, as shown, each home or business establishment, in this example, can include a Wi-Fi/RF interface 29 (with a bandpass filter).

Figure 6:
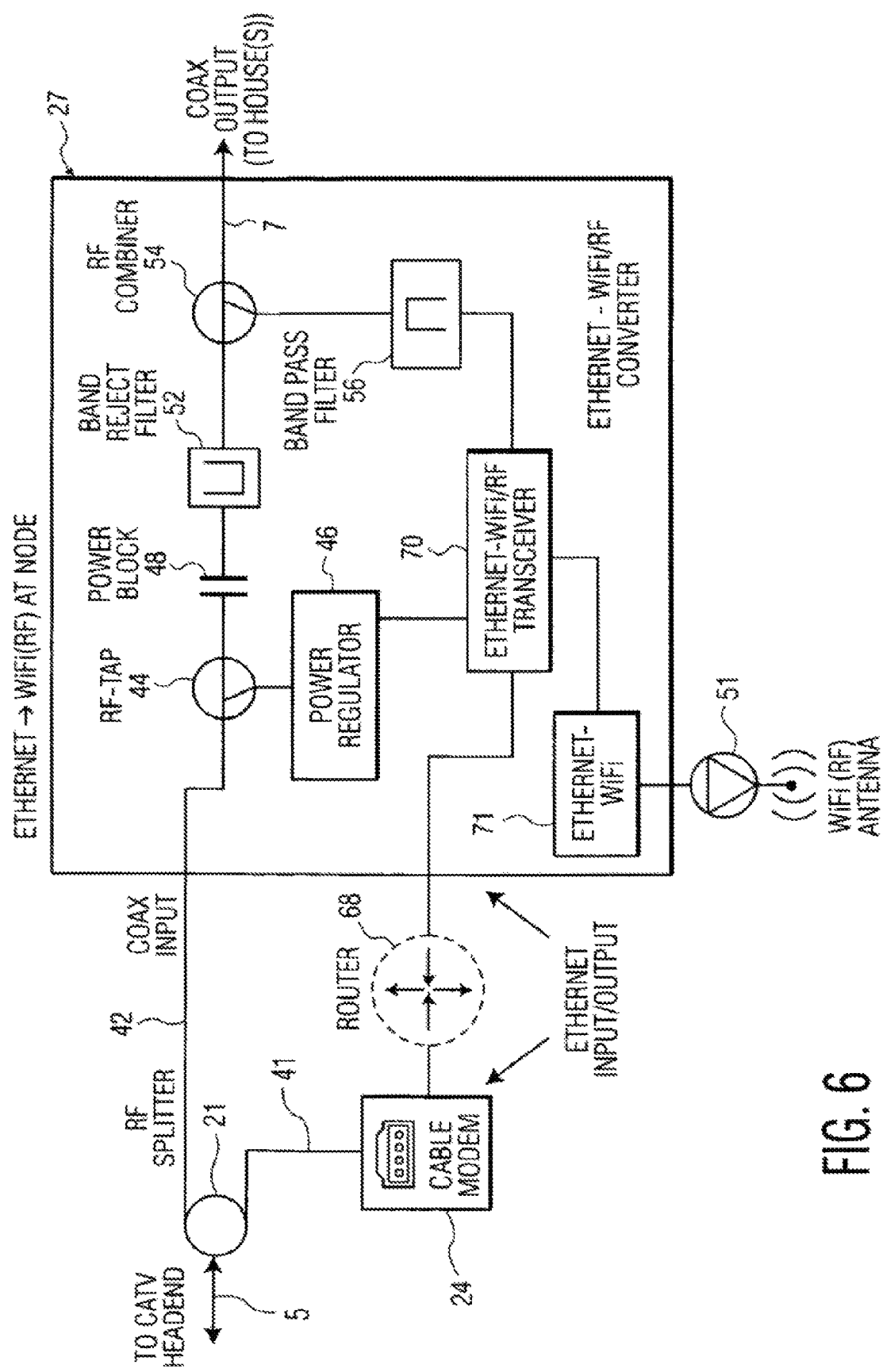
FIG. 6 is a block diagram showing a novel Ethernet-to-Wi-Fi (RF) converter included in the CATV node for the second embodiment of the invention.

With further reference to FIG. 6, the Ethernet-to-Wi-Fi/RF converter 27 is similar to that of the Ethernet-to-RF converter of FIG. 3. However, in FIG. 6, the Ethernet-to-Wi-Fi/RF transceiver 70 is substituted in place of the Ethernet-RF Transceiver 50 which converts signals from transceiver 70 to drive Wi-Fi (RF) antenna 51, which is an optional feature. Also, a router 68 is included for routing Ethernet signals to individual subscribers, and to Ethernet-Wi-Fi/RF transceiver 70. As will be discussed in greater detail below, the frequency characteristics of the bandpass filter 56 and band reject filter 52 of the invention may not necessarily be the same for different embodiments of the invention.

Figure 7:
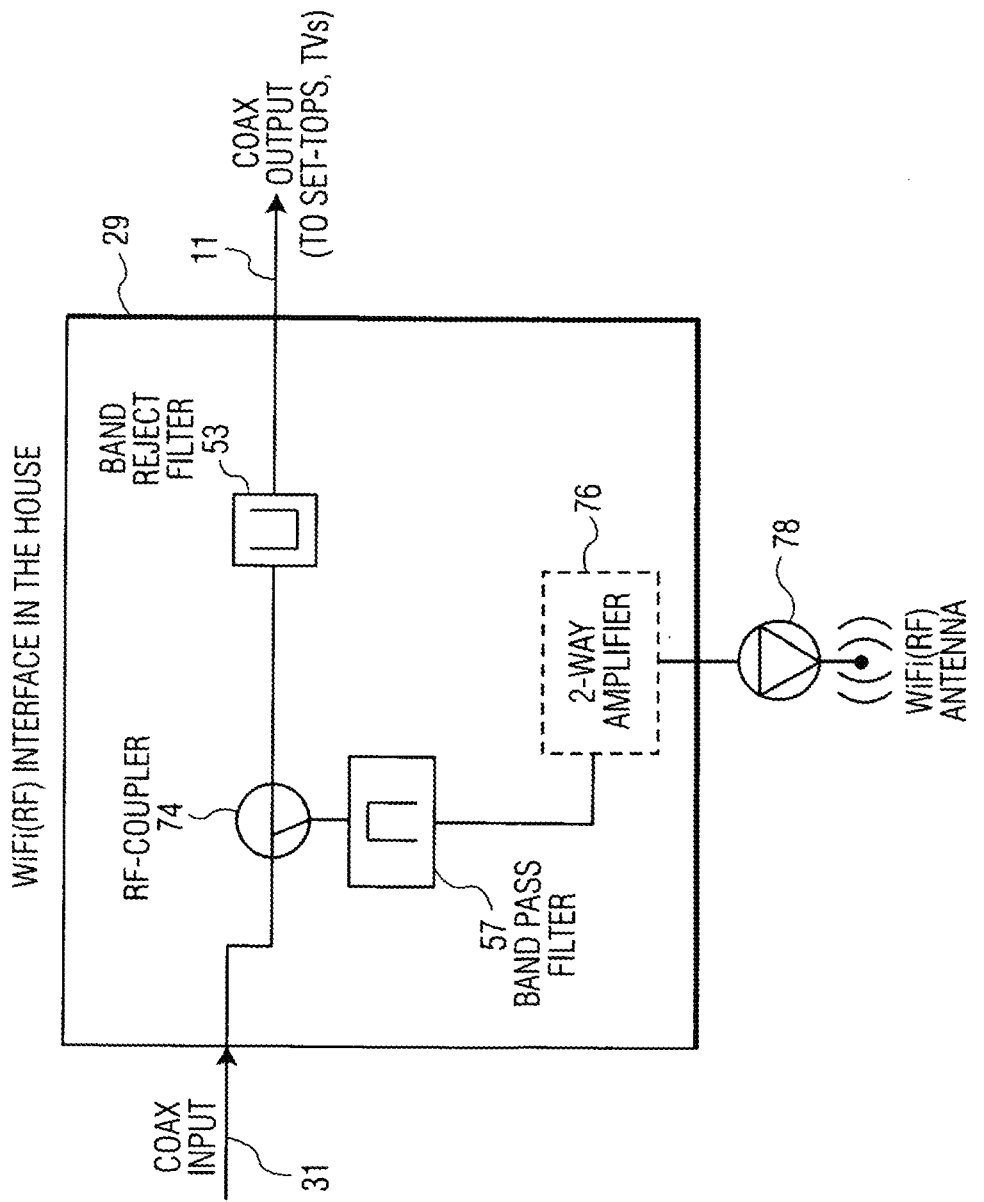
FIG. 7 shows a block diagram of a novel Wi-Fi (RF) interface device included within each subscriber's home for the second embodiment of the invention.

In FIG. 7, an example of a Wi-Fi/RF interface or device 29 with a bandpass filter is shown. Device 29 includes an RF coupler 74 receptive of CATV signals from coaxial cable 31, for splitting off a portion to a bandpass filter 57, and another portion to a band reject filter 53. The output of the bandpass filter 57 is passed through an optional 2-way amplifier 76 to a Wi-Fi (RF) antenna 78. The output of the band reject filter 53 is connected via coaxial cable 11 to set-tops, TVs, etc.

Figure 8:
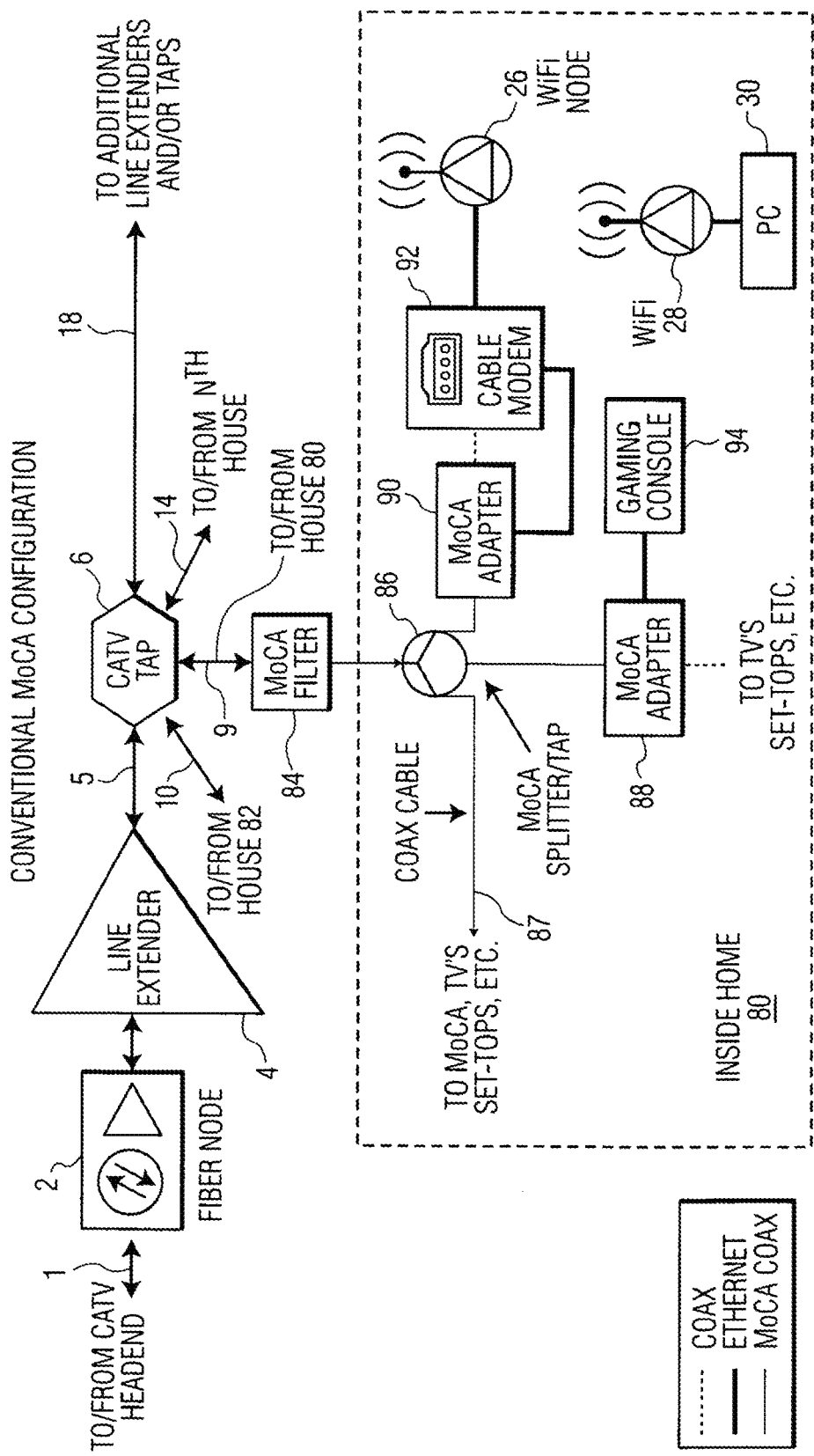
FIG. 8 is a block diagram showing a conventional or known MoCA configured CATV network from a CATV provider's head end to within the home of a subscriber.

In FIG. 8, a conventional or known MoCA network configuration is shown. The portions of this network that are the same as those of the network of FIG. 1 will not be further described here. A MoCA filter 84 is included between various subscriber homes and/or business establishments for preventing signals within the present MoCA frequency band from 1,125 MHz (megahertz) to 1,675 MHz from exiting or entering the associated home, such as home 80. Within a home such as home 80, a MoCA splitter 86 is receptive of the CATV output signals from within the home or business establishment. Splitter 86 splits off a portion of the signals individually to MoCA adapters 88, and 90, respectively, and to MoCA televisions, set tops, and so forth, as shown in this example. MoCA adapter 90 provides RF output signals to a cable modem 92, and receives Ethernet signals from cable modem 92. Also, Ethernet output signals from cable modem 92 are connected to the Wi-Fi node 26. In this example, MoCA adapter 88 provides CATV output signals to a gaming console 94, and to MoCA enabled television sets, set-tops, and so forth.

Figure 9:
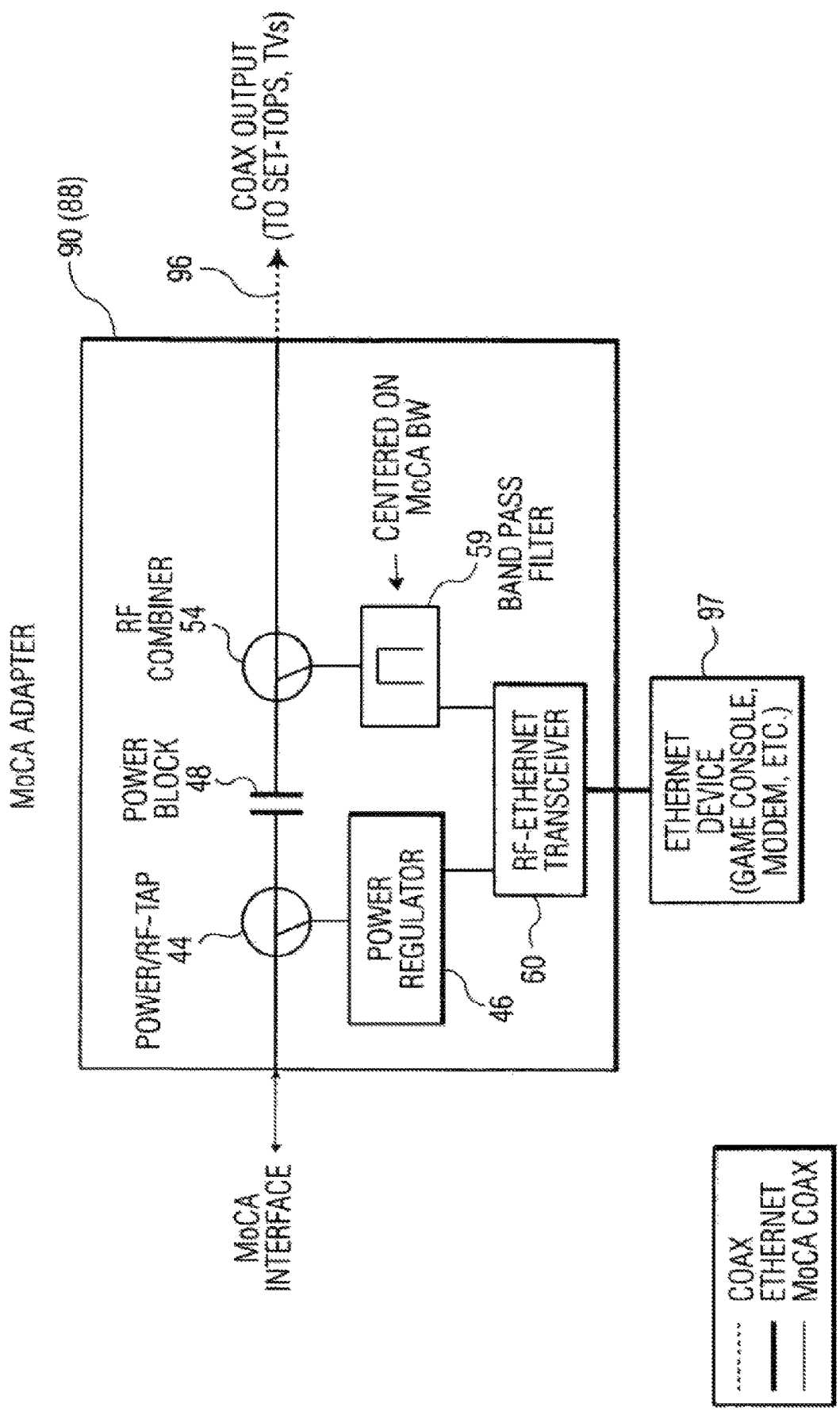
FIG. 9 is a block diagram showing a MoCA adapter device for use in each subscriber's home in the known MoCA configured CATV network of FIG. 8.

In FIG. 9, an example of a MoCA adapter design that is identical for MoCA adapters 88, 90, is shown for an embodiment of the invention, but is not meant to be limiting. The adapter 88, 90 includes a DC/RF tap or splitter 44 receptive of MoCA signals for inserting off a DC voltage (if included on the signal input line) to a power regulator 46 (a DC voltage may otherwise be provided in the home 84 powering power regulator 46), and the MoCA signals through a DC blocking capacitor 48 to an input of an RF combiner 54. The RF combiner 54 passes one portion of the signals via a coax cable 96 to MoCA enabled TVs, set-tops, modems, and so forth, and to a bandpass filter 59. The output of the bandpass filter 59 is inputted to an RF-to-Ethernet transceiver 60. In MoCA adapter 88, the RF-to-Ethernet Transceiver 60 provides Ethernet signals to and from an Ethernet device 97 (game console, etc.). In MoCA adapter 90, its coaxial output 96 provides RF signals to a cable modem 92 (see FIG. 8).

Figure 10:
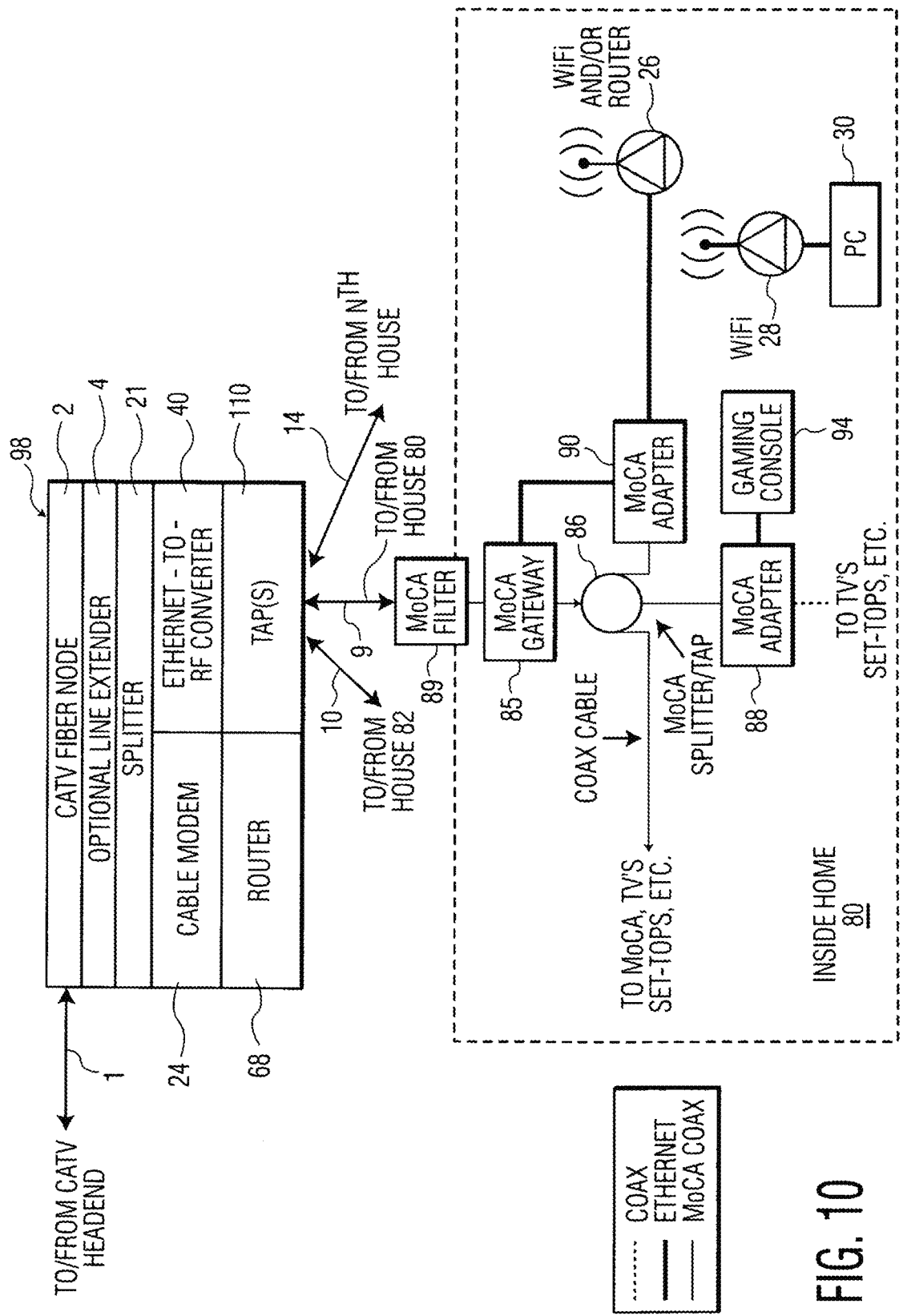
FIG. 10 is a block diagram for a MoCA configured CATV network in which a cable or CATV modem is included within the provider's CATV node for serving a plurality of home subscribers, in this example, thereby eliminating the need for a cable modem in the homes and/or business establishments of the subscribers, for a third embodiment of the invention, also in which an Ethernet-to-RF converter device is included in the provider's CATV node.

FIG. 10 shows a third embodiment of the invention providing a MoCA configured network in which the cable modem 92 found in the homes and/or business establishments of subscribers using the conventional MoCA network (see FIG. 9) has been eliminated, whereby a CATV modem 24 is installed in a CATV node 98, as shown, in the CATV distribution system. The CATV node 98 further includes a CATV fiber node 2 driving an optional line extender 4. If the line extender 4 is used, its amplified output is connected to a splitter 21, otherwise the input of the splitter 21 is directly connected to the output of the CATV fiber node 2. Splitter 21 splits the CATV RF signal into two portions, one of which is connected to a cable modem 24 (see FIG. 3) for converting the Ethernet output from modem 24 into RF signals for inputting to tap(s) 110, as shown. The outputs of the taps are individually connected via coaxial cables 10, 9, and 14, in this example, to a plurality of homes and/or business establishments, but additional taps can be provided for connection to many more homes or businesses establishments. Coax cable 9 is connected to a MoCA filter 89. The output of MoCA filter 89 is connected to the input of a MoCA Gateway 85. MoCA filter 89 bidirectional blocks signals within the MoCA bandwidth, thereby preventing MoCA signals from traveling between a CATV provider distribution system and subscriber's homes or business establishments. Also, as further described below, the MoCA filter 89 can either be separate from the MoCA Gateway 85, or incorporated therein. The Ethernet output from cable modem 24 is connected to the input of a router 68, that provides a plurality of Ethernet signals via an Ethernet-to-RF converter to a plurality of subscriber's homes or business establishments, respectively.

The design for an Ethernet-to-RF converter 100 (see FIG. 11) is shown for another embodiment of the invention, but is not meant to be limiting. Note that the converter 100 is substantially the same as the design for the Ethernet-to-RF converter 40 of FIG. 3. However, in this third embodiment of the invention the cable modem 92 can be a next generation modem (DOCSIS 3.1), which is not limited to MoCA applications, and can apply equally to previously mentioned cable modem 24. The Ethernet output from cable modem 92 is fed to a router 68 for feeding the Ethernet output individually to multiple subscriber houses or business establishments via Ethernet-to-RF converter 40 (see FIG. 3), as previously mentioned. Note that the RF splitter 21, cable modem 92, router 68, and Ethernet-to-RF converter 100 can all be located in association with other line extenders, fiber node's, and/or taps that may be included in the CATV distribution system, for example. Also note that an Ethernet output from router 68 can also be converted into an optical signal by an Ethernet-to-optical converter (not shown) for connection of the resultant optical signals by a fiber optic cable 104 to the headend of a CATV provider via direct data connection. This latter feature can be utilized with the above-described other embodiments of the invention.

Figure 12:
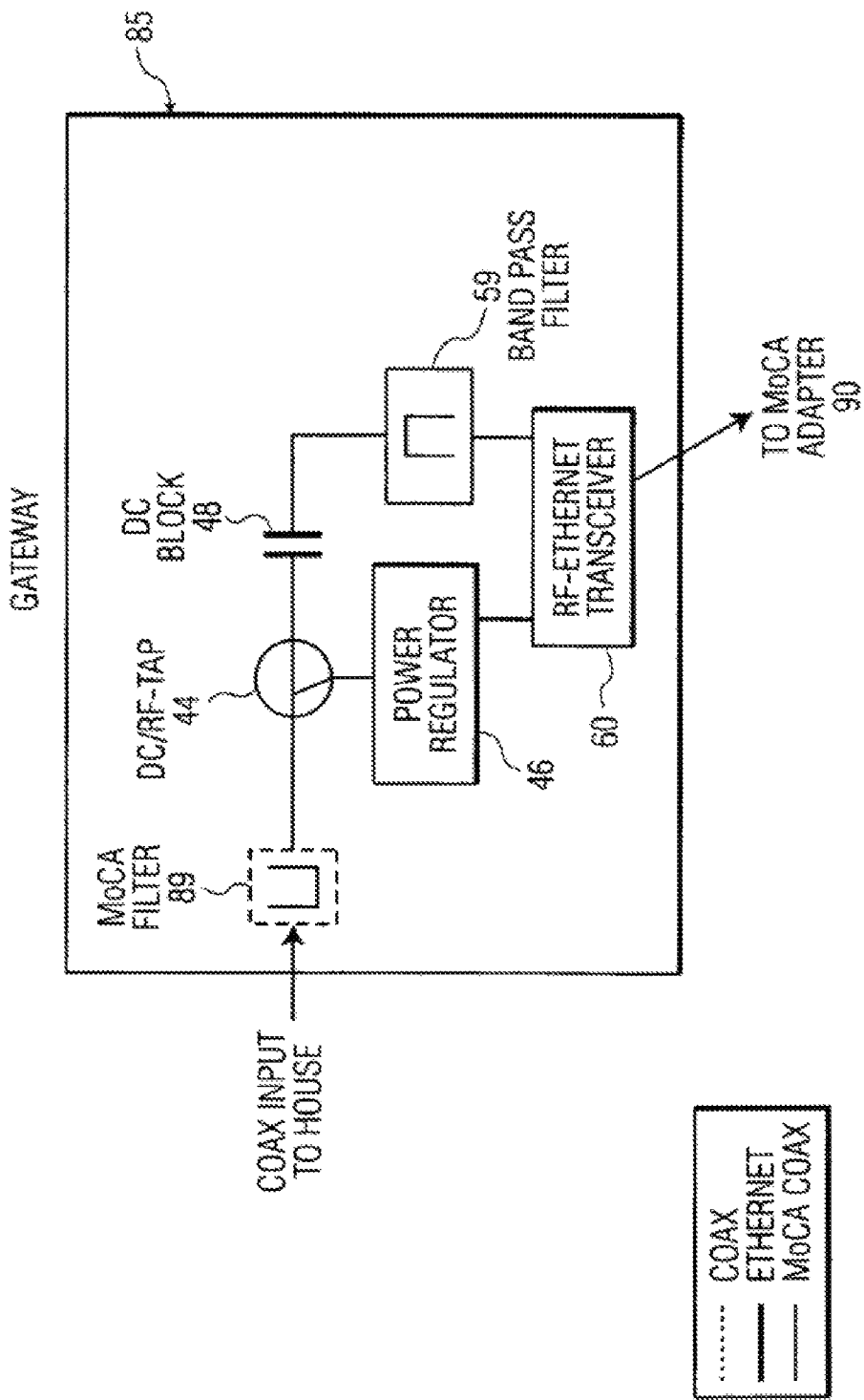
FIG. 12 is a block diagram showing a novel MoCA gateway device included in the third embodiment of the invention.

The design for the MoCA Gateway device 85 (see FIG. 10) is shown in FIG. 12 for an embodiment of the invention, but is not meant to be limiting. CATV signals from CATV node 98 are inputted to a MoCA filter 89 (see above) for only partially blocking MoCA signals to a DC/RF tap/splitter 44. Power regulator 46 provides power to the RF-to-Ethernet transceiver 60. Note that the power regulator 46 will be provided power in the associated subscriber's home or business establishment. The DC/RF splitter 44 also splits off the MoCA signals to a DC blocking capacitor 48 for passing the signals to a bandpass filter 59. Signals from the bandpass filter 59 are outputted to the RF-to-Ethernet transceiver 60. As shown in FIG. 10, the Ethernet output signals from transceiver 60 are connected to MoCA adapter 90. Note further that in this example the MoCA filter 89 is included within the Gateway device 85, in this example.

It should be noted that the various embodiments of the present invention are meant to include bidirectional signal transfer between the headend of the cable provider and each subscriber's home. Also, as previously indicated, the present MoCA bandwidth is between 1,125 MHz and 1,675 MHz. In addition, the present CATV ultra wideband signal bandwidth is preferably 3,200 MHz to 4,700 MHz, but can be a otherwise. The present 802.11 Wi-Fi 2,400 MHz band has a bandwidth from 2,400 MHz to 2,500 MHz. The present 802.11 Wi-Fi 5,000 MHz band has a bandwidth from 4,915 MHz to 5,875 MHz. These frequency bands are periodically updated by industry trade associations, technological advances, and so forth.

The frequency bands for the bandpass filters of the present invention will now be described, but are not meant to be limiting. The bandpass filters 56, and band reject filters 52, respectively, shown in FIGS. 3, 4, and 11, respectively, for Ultra Wideband each have the frequency response band of the latter, for 802.11 WiFi 2,400 MHz band each have the frequency response band of the latter, for 802.11 WiFi 5,000 MHz band each have the frequency response band of the latter, and for the MoCA band each have the frequency response band from 1,125 MHz to 1,225 MHz. The band reject filter 52, and band pass filter 56, of FIG. 6 and the band reject filter 53 and band pass filter 57 of FIG. 7, respectively, for 802.11 WiFi 2,400 MHz each have the frequency response band of the latter, and for 802.11 WiFi 5,000 MHz, each have the frequency band response of the latter. In FIG. 9, bandpass filter 59 has a frequency response band the same as the MoCA frequency band. In FIG. 12, the bandpass filter 59 has a frequency response band from 1,125 MHz to 1,225 MHz. Also, the MoCA filter 89 in either FIG. 10 or FIG. 12 blocks 1,350 MHz-to-1,675 MHz, and passes 1,125 MHz to 1,225 MHz.

In the proposed invention (FIG. 2), the functionality of the CATV modem 24 has been "removed" from the house 34 is, and moved "upstream" within the CATV Node 36 of the CATV network, as shown. In doing so, the modem 24 functionality (which can support multiple sessions simultaneously) can be shared by all houses connected to the same CATV node, reducing the overall cost of CATV modem deployment for a CATV operator. As illustrated, this functionality could be included within the CATV node. This CATV modem functionality could also be included as part of the line extender or tap functionality that were previously shown in FIG. 1, but not separately illustrated in FIG. 2.

The main difference (to the proposed invention) in where this modem 24 functionality is placed within the last mile (either at the node, line extender or tap) effects the "amount" of sharing possible of the modem functionality. If the modem 24 is placed at the fiber node 2, this modem 24 can be shared amongst all paying CATV customers (homes and/or business establishments) within the last mile connected to the node 36. If the modem 24 is placed further away from the node 36 and closer to the homes and/or business establishments (i.e., at one of the line extenders), then the modem 24 will be shared amongst fewer homes and/or business establishments, and is limited to those homes and/or business establishments directly connected to that line extender. If the modem 24 is placed still further away from the node and closer to the homes and/or business establishments (i.e., at one of the CATV system taps 6), then the modem 24 will be shared amongst even fewer homes and/or business establishments of subscribers, and is limited to those subscribers directly connected to that tap. Note that bandwidth per subscriber increases as the number of subscribers is reduced.

Regardless of where the modem 24 is located in the last mile, given that the output of the CATV modem 24 is baseband high speed data, this data must first be converted back to RF for transport to/from the house(s). This conversion is provided by the Ethernet-RF converter 40 as detailed in FIG. 3 (within the CATV node 36 as illustrated, or potentially also within the line extender or CATV system tap, as described above).

Within the house, FIG. 2 indicates removal of the CATV modem 24 functionality, and the addition of an RF-Ethernet converter 38. This RF-Ethernet "converter" 38 basically "undoes" the Ethernet-RF conversion provided by converter 40 added outside the home (at the node 36, in this example, or at a line extender or tap), now that the modem 24 is being placed outside the home. The frequencies selected for this conversion are the same on both sides, (i.e., outside and inside the home), and are consistent with available spectrum on the last mile of the CATV system, using cost effective technology. Given that, these RF frequencies could be the conventional unlicensed 802.11 band such as typically used for low power WiFi communications, or it could be a different frequency band altogether, including "Ultra Wide Band" frequencies and modulation (3,200 MHz to 4,700 MHz, as one such example). The only stipulation on the frequency band, is that it is not in a range already in use on the last mile of coaxial cable/CATV system, for transport of either the video/audio signals, high speed data or control signals.

FIG. 3 details the components located at the fiber node 2, as well as within the Ethernet-RF conversion device 40. Here again, these components could also be located at the line extender or CATV system tap, as explained previously. It should also be noted that these two functional components (CATV modem 24 and Ethernet-RF converter 40) could be combined into a single unit, as well as combined together or separately within the node 36, line extender, or tap enclosure.

Powering for the CATV modem 24 and the Ethernet-RF converter 40 can be provided from either the home, or via the existing (or supplementally added) powering from the CATV network. At the Coax Input, a "DC/RF tap 44" is provided (see FIG. 3), when external powering is supplied from the CATV system itself. As such, the DC (or low frequency AC) "i.e., powering voltage" is "tapped off" the center conductor of the coax, and connected to the Power Regulator 46 within the conversion device 40. Also included is a DC block (such as a capacitor 48), which prevents the imbedded DC signal from shorting out, within the conversion device 40. Alternatives to this powering method include powering from the house(s), in which case the location of the DC/RF tap 44 and DC blocking capacitor 48 would be reversed (i.e., appearing on the Coax Output versus the Coax Input as indicated in FIG. 3.)

In concert with the Ethernet-to-RF transceiver 50, is a "band reject filter 52" consistent with the frequency range selected for the transceiver 50, which clears any residual noise/signals that may be present within the chosen bandwidth. This band reject filter 52 also prevents any of the "Ethernet signals now modulated at RF" from being broadcast "upstream" onto the main coax cable. Also indicated is a "band pass filter" 56 consistent with the frequency range and band reject filter, to minimize any spurious signals from being outputted from the Ethernet-RF converter 40 onto the CATV network or into the home(s), outside the desired conversion frequency band. Lastly, within the Ethernet-RF converter 40, the modulated RF output of the Ethernet-RF transceiver 50 is combined with the existing RF signals present from the coax input an RF combiner 54, and transported on the coax cable to the house(s) served by the fiber node 2, line extender or tap.

As detailed in FIG. 2, within each house, the CATV signal is split "functionally" as described previously above. On the "high speed data (right) side", the CATV signal first enters an RF-Ethernet converter 38, basically "re-converting" the (high speed data portion of the) RF signal back to a baseband Ethernet signal, for input into a conventional WiFi node 26 (either separate or integrated, as also described previously). The left side remains unchanged from FIG. 1. FIG. 4 details the internal components of this RF-Ethernet converter 38 within the home(s).

FIG. 5 illustrates a further advancement and embodiment of the invention, where additional functionality is removed from the house(s) and placed at the fiber node 2 (or line extender or CATV system tap, as in previously described embodiments), where again, it can be shared by additional homes and/or business establishments. In this configuration, the WiFi node 26 (or other appropriate frequency band) transceiver functionality are also removed from the house, resulting in additional cost reductions for the CATV operator. Note that as previously mentioned homes is meant to be synonymous with homes and/or business establishments.

FIG. 6 details the additional functionality now present in the CATV network (shown at the fiber node 2, although could also be implemented at the line extender or tap as described previously), including an Ethernet-to-WiFi/RF converter 27. A separate router might also be required, if the routing functionality is not already present within the Ethernet-to-WiFi/RF transceiver 70. As before, the band reject filter 52 prevents the RF (WiFi or alternative RF) from travelling "upstream" on the CATV system. The band pass filter 56 also functions as before, to minimize any spurious signals from being outputted from the Ethernet-WiFi/RF converter 27 onto the CATV network or into the home(s), outside the transceiver 70 desired frequency band. Powering for these additional components could also be from the home or the CATV network, as before. Here again, these additional components (CATV modem 24, Ethernet-WiFi/RF transceiver 70 and router 68, as shown in FIG. 6 if so required) could be physically housed individually, in combination with each other, or within the fiber node 2, line extender or tap itself.

FIG. 7 details the WiFi/RF interface present within the home in this implementation. The input signal to the WiFi/RF interface is first split, with the WiFi/RF band presented to the WiFi/RF antenna 78 for transmission within the house (via a bandpass filter 57 (likely a SAW filter) centered at within the WiFi/RF band, to prevent transmission of the other CATV signals within the home 34). An optional 2-way amplifier 76 may also be included as indicated, depending on the WiFi/RF signal levels present at the WiFi/RF antenna 78. The other output of the splitter/RF coupler 74 within the WiFi/RF interface is interfaced via coax cable to the TV's via band reject filter 53. FIGS. 8 through 12 detail a specific case of the above implementation, by using a uniquely defined portion of the spectrum to communicate data signals between the node/line extender/tap, and the home(s). This implementation sets aside that spectrum, as defined by MoCA (Multimedia Over Coax Alliance).

FIG. 8 highlights the current industry MoCA implementation, including a "MoCA Filter" 84 placed at the point of entrance of each home, such as home 80, to prevent the MoCA signals from interfering with both the CATV network and other homes and/or business establishments (also carrying MoCA signals), as previously mentioned. This "band reject" MoCA filter 84 is centered to block the above MoCA band (and as such, any specific channel within the MoCA band) from exiting (or entering) each household. It should also be noted is that the specific channel selected can be re-used by another household on the CATV network, as a result of this MoCA filter 84. The coaxial cable 87 transports both the conventional CATV communications signals, as well as the "MoCA generated" frequency communications. FIG. 9 details the general internal functionality of a MoCA adapter 90 (88), which as can be seen is very similar to the prior converter 38 of FIG. 4, except that it is specific to the MoCA band defined above, and is how these MoCA frequency communications are generated within the home(s).

As in FIG. 2, FIG. 10 removes the modem functionality from the home and places it at the fiber node 2 (or line extender or CATV tap, as before), the only difference being that the communications between the house and this external modem 92 is accomplished within the MoCA frequency band. To facilitate this (and consistent with the MoCA frequency plan), a second (and different) MoCA channel is used to communicate between the (now external) modem and the home(s). In this case, the MoCA filter 89 detailed in FIG. 10 is slightly different than MoCA filter 84 in FIG. 8, and that MoCA filter 89 passes this second MoCA frequency band into and out of the home, yet still blocks the original MoCA channels from exiting (or entering) the home. Because there are plurality of channels within the MoCA band, this could be easily accommodated. It should be noted that there is also the option to use the MoCA (first channel) within the home(s), and use a totally different frequency band (like WiFi, for example), for communications between the home and the external modem. In this case, the MoCA filter 89 in FIG. 10 would be identical to the MoCA filter 84 of FIG. 8.

Figure 11:
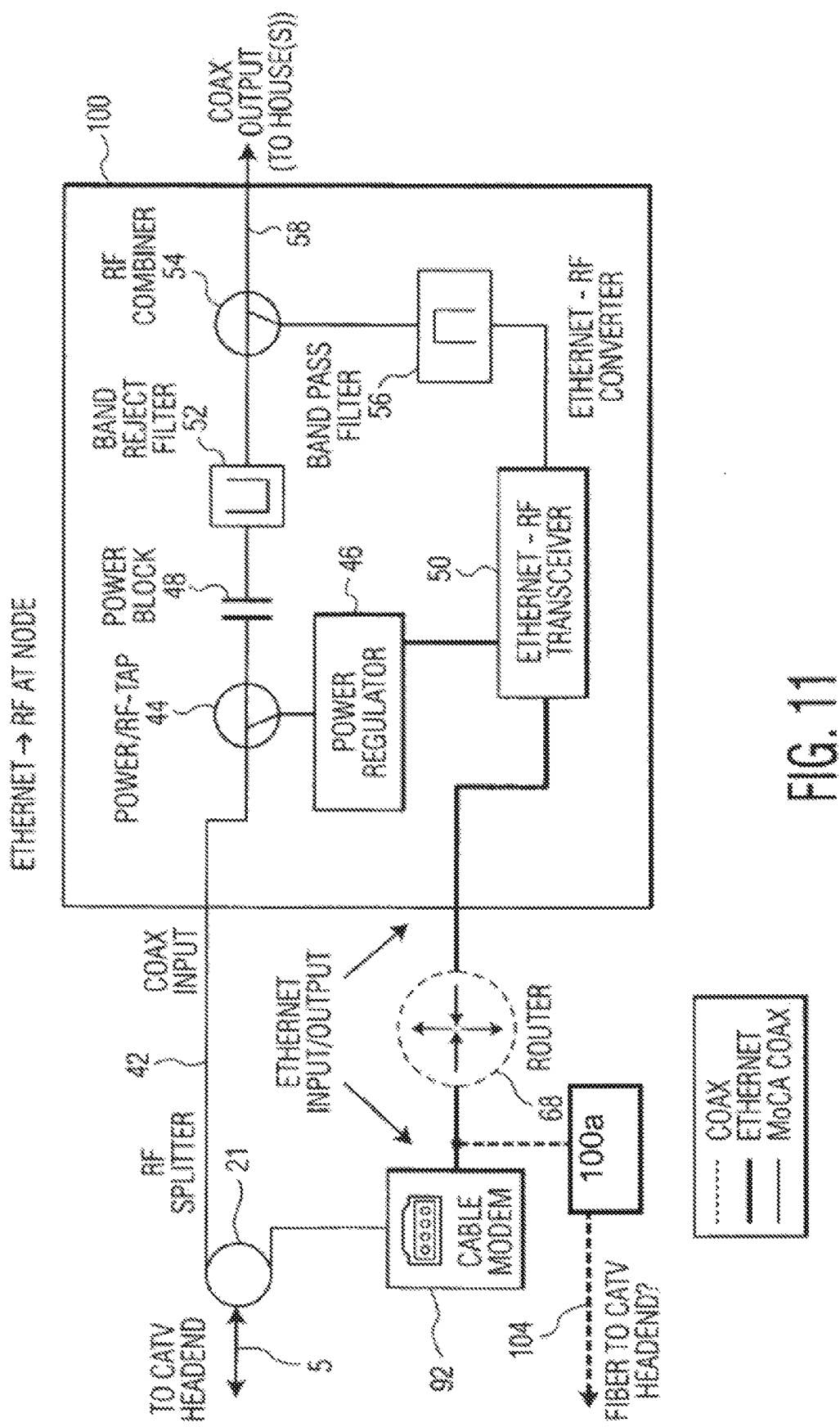
FIG. 11 is a block diagram showing a novel Ethernet-to-RF converter device included in the third embodiment of the invention.

FIG. 11 (similar again to FIG. 6) highlights the conversion of the output of the modem 92 to an RF frequency via Ethernet-to-RF converter 100, for communications to and from the home(s). Consistent with the above paragraph, this frequency could be a (second) MoCA channel altogether (from the first MoCA channel within the home), or a different frequency altogether (as was the case in FIG. 6). Also consistent with FIG. 6 is an optional router 68 functionality, if not so already included within the modem.

If excess dark fiber is available to the fiber 2 node, converter 100*a* of FIG. 11 also provides for both the possibility of the elimination of the modem 92 altogether, by allowing for a "direct data" connection (via the excess fiber) to a more centralized location within the CATV system (at the CATV headend, for example). This could provide significantly more data rates and better response times available to each home, than a conventional DOCSIS (industry standard) modem. Alternatively, a DOCSIS 3.1 modem 92 can be located at the fiber node 2 (or line extender or CATV tap), to also provide additional data rates into each home(s), especially if the data link from and to the node/line extender or tap, can support very high data rates (such as are possible with Ultra Wide Band, for example.

Lastly, FIG. 12 shows the design of the MoCA Gateway 85 shown generally in FIG. 10 (it represents an RF-MoCA gateway) present within the home 34, in this example, that "reconverts" the frequency used to communicate between the home and the external modem 92 of FIG. 11. Here again (similar to FIG. 4), the MoCA filter 89, and bandpass filter 59, are centered consistent with the filters of FIG. 11, depending upon which frequency band is selected to communicate between the house and the external modem 92. The output of the MoCA gateway 85 is connected to the MoCA Adapter 90 showing in FIG. 9.

Various embodiments of the present invention have been shown and described above, but are not meant to be limiting. Those of skill in the art may recognize certain modifications to these embodiments, which modifications are meant to be covered by the spirit and scope of the appended claims. For example, devices that are removed from the subscriber's homes or business establishments, as described above for various embodiments of the invention, can be located at any practical positions in the CATV distribution network in association with various of the devices, such as fiber node's, line extenders, and taps, respectively, for example. Also, it should be noted that there are many industrial standards such as Ethernet, whereby in the present embodiments of the invention USB signals can be a substituted for Ethernet signals.

The invention claimed is:

1. A community antenna television (CATV) distribution system comprising:
   a CATV provider main distribution system that comprises:
      a fiber node that converts CATV optical signals from a headend of the CATV provider main distribution system into CATV RF signals,
      an RF splitter that splits the CATV RF signals into CATV modem signals and Power/RF signals, wherein the Power/RF signals comprise a low frequency AC powering voltage, and
      one or more taps;
   a CATV modem, located at at least one of the one or more taps, that converts the CATV modem signals into Ethernet signals; and
   an Ethernet-to-RF converter, co-located with the CATV modem, that comprises:
      a coaxial input that receives the Power/RF signals,
      an Ethernet input that receives the Ethernet signals,
      a band reject filter that receives the Power/RF signals from the coaxial input, wherein the band reject filter rejects frequencies of Power/RF signals which are in a predetermined frequency band to form first filtered signals,
      an Ethernet-to-RF transceiver that receives the Ethernet signals from the CATV modem and converts the Ethernet signals into RF signals,
      a bandpass filter that receives RF signals from the Ethernet-to-RF transceiver and permits transmission of portions of the RF signals within the predetermined frequency band to form second filtered signals,
      an RF combiner that individually receives the first filtered signals and the second filtered signals from the band reject filter and the bandpass filter and combines the first filtered signals and the second filtered signals to form combined signals, and
      a coaxial output that outputs the combined signals from the RF combiner,
   wherein the one or more taps comprises at least one CATV tap for receiving the combined signals from the coaxial output of the Ethernet-to-RF converter.

2. The system of claim 1, further comprising:
   at least one line extender/amplifier connected between an output of the fiber node and an input of the CATV modem.

3. The system of claim 1, wherein:
   the predetermined frequency band comprises at least one of
   an ultra wideb and,
   a 2.4 GHz Wi-Fi band,
   a 5.0 GHz Wi-Fi band and
   a Multimedia over Coax Alliance (MoCA) band.

4. The system of claim 1, wherein the one or more taps further comprise distribution taps for individually tapping off portions of the combined signals for independent distribution to a plurality of establishments.

5. The system of claim 4, further comprising:
   an RF-to-Ethernet converter located within each establishment for receiving the combined signals from a particular tap of the distribution taps and converting the RF signals into home Ethernet signals for use within the establishment; and
   a Wi-Fi node, located in each establishment, for receiving home Ethernet signals from the RF-to-Ethernet converter and transmitting the home Ethernet signals within each respective establishment for use by devices configured to receive and use Wi-Fi.

6. The system of claim 5, wherein the RF-to-Ethernet converter comprises:
   an input that receives the combined signals from the particular tap to generate a home RF signal;
   a bandpass filter that receives the home RF signal and permits a portion of the home RF signal within the predetermined frequency band to generate first filtered home signals; and
   an RF-to-Ethernet transceiver that receives the first filtered home signals from the bandpass filter and converts the first filtered home signals into the home Ethernet signals;
   a band reject filter that receives the first filtered home signals from the input and rejects portions of the first filtered home signals in the predetermined frequency band to generate second filtered home signals, wherein the second filtered home signals are provided to television sets, set tops, and other devices within each respective establishment; and
   wherein the Wi-Fi node receives the home Ethernet signals from the RF-to-Ethernet transceiver and transmits Wi-Fi signals within an associated home or business establishment for use by devices configured to receive the Wi-Fi signals.

7. The system of claim 6, wherein:
   the predetermined frequency band comprises at least one of
   an ultra wideband, a 2.4 GHz Wi-Fi band,
   a 5.0 GHz Wi-Fi band and
   a Multimedia over Coax Alliance (MoCA) band.

8. The system of claim 1, further comprising:
   a router connected to the CATV modem that provides the Ethernet signals individually to a home or business of each of a plurality of subscribers.

9. An Ethernet-to-RF converter, comprising:
   a coaxial input that receives Power/RF signals from a community antenna television (CATV) provider, wherein the Power/RF signals comprise a low frequency AC voltage that is passed to a power regulator;
   an Ethernet input that receives Ethernet signals;
   a band reject filter that receives the Power/RF signals from the coaxial input, wherein the band reject filter rejects frequencies of the Power/RF signals which are in a predetermined frequency band to form first filtered signals;
   an Ethernet-to-RF transceiver that receives the Ethernet signals from the Ethernet input and converts the Ethernet signals into RF signals;
   a bandpass filter that receives the RF signals from the Ethernet-to-RF transceiver and permits transmission of portions of the RF signals within the predetermined frequency band to form second filtered signals;
   an RF combiner that individually receives the first filtered signals and the second filtered signals from the band reject filter and the bandpass filter and combines the first filtered signals and the second filtered signals to form combined signals; and a coaxial output that outputs the combined signals from the RF combiner.

10. The Ethernet-to-RF converter of claim 9, wherein the power regulator provides power to the Ethernet-to-RF transceiver.

11. The Ethernet-to-RF converter of claim 9, wherein a CATV modem provides the Ethernet signals to the Ethernet input.

12. The Ethernet-to-RF converter of claim 9, wherein an Ethernet-to-optical converter provides the Ethernet signals to the Ethernet input.

13. A community antenna television (CATV) distribution system comprising:

a CATV provider main distribution line that comprises:
a fiber node that converts optical signals from a headend of the CATV provider main distribution line into CATV RF signals,
an adapter that adds a low frequency AC voltage to the CATV RF signals to form Power/RF signals, and
one or more taps;

an Ethernet-to-optical converter that converts the optical signals from the headend into Ethernet signals;

an Ethernet-to-RF converter communicatively coupled to the Ethernet-to-optical converter that comprises:
a coaxial input that receives the Power/RF signals, wherein the voltage from Power/RF signals is passed to a power regulator,
an Ethernet input that receives the Ethernet signals,
a band reject filter that receives the Power/RF signals from the coaxial input, wherein the band reject filter rejects frequencies of Power/RF signals which are in a predetermined frequency band to form first filtered signals,
an Ethernet-to-RF transceiver that receives the Ethernet signals from the Ethernet input and converts the Ethernet signals into RF signals,
a bandpass filter that receives RF signals from the Ethernet-to-RF transceiver and permits transmission portions of the RF signals within the predetermined frequency band to form second filtered signals,
an RF combiner that individually receives the first filtered signals and the second filtered signals from the band reject filter and the bandpass filter and combines the first filtered signals and the second filtered signals to form combined signals,
and a coaxial output that outputs the combined signals from the RF combiner; and wherein the one or more taps comprises at least one CATV tap for receiving the combined signals from the coaxial output of the Ethernet-to-RF converter.

14. The system of claim 13, wherein the one or more taps further comprise distribution taps for individually tapping off portions of the combined signals for independent distribution.

15. The system of claim 13, wherein:
the predetermined frequency band comprises at least one of
an ultra wideb and,
a 2.4 GHz Wi-Fi band,
a 5.0 GHz Wi-Fi band, and
a Multimedia over Coax Alliance (MoCA) band.

16. A method for community antenna television (CATV) distribution, the method comprising:
receiving, by an input of an Ethernet-to-RF converter, Power/RF signals from a CATV provider, wherein the Power/RF signals comprise a low frequency AC voltage that is passed to a power regulator of the Ethernet-to-RF converter;
receiving, by an Ethernet input of the Ethernet-to-RF converter, Ethernet signals from the CATV provider;
forming, by a band reject filter of the Ethernet-to-RF converter, first filtered signals by receiving the Power/RF signals from the input and rejecting frequencies of the Power/RF signals which are in a predetermined frequency band to form first filtered signals;
converting, by an Ethernet-to-RF transceiver of the Ethernet-to-RF converter, the Ethernet signals from the Ethernet input into RF signals;
forming, by a bandpass filter of the Ethernet-to-RF converter, second filtered signals by receiving the RF signals from the Ethernet-to-RF transceiver and permitting transmission of portions of the RF signals within the predetermined frequency band; and
forming, by an RF combiner of the Ethernet-to-RF converter, combined signals by individually receiving the first filtered signals and the second filtered signals from the band reject filter and the bandpass filter and combining the first filtered signals and the second filtered signals; and
outputting, by an output of the Ethernet-to-RF converter, the combined signals from the RF combiner.

17. The method of claim 16, further comprising:
feeding, using one or more distribution taps, the combined signals to an associated home or business establishments of a plurality of subscribers, wherein the one or more distribution taps individually tap off portions of the combined signals for independent distribution.

18. The method of claim 16, further comprising:
transmitting, via a fiber optical cable, optical signals between headend of the CATV provider and the Ethernet-to-RF converter.

19. The system of claim 5, wherein the RF-to-Ethernet converter comprises:
an input that receives the combined signals from the particular tap to generate a home RF signal;
a bandpass filter that receives the home RF signal and permits a portion of the home RF signal within the predetermined frequency band to generate first filtered home signals; and
antennae that receives the first filtered home signals from the bandpass filter and transmits the first filtered home signals as home Wi-Fi signals;
a band reject filter that receives the first filtered home signals from the input and rejects portions of the first filtered home signals in the predetermined frequency band to generate second filtered home signals, wherein the second filtered home signals are provided to television sets, set tops, and other devices within each respective establishment.

20. The system of claim 19, wherein the antennae receives the first filtered home signals via a signal amplifier.

21. The system of claim 5, wherein the home Ethernet signals in the respective establishment are further directly provided to Ethernet devices via wired connections.

* * * * *